United States Patent [19]

Oikawa et al.

[11] Patent Number: 4,592,651

[45] Date of Patent: Jun. 3, 1986

[54] COPIER WITH BOOKBINDING FUNCTION

[75] Inventors: Tomohiro Oikawa, Yokohama; Kenichi Shimizu, Kawasaki; Shigeru Suzuki, Yokohama; Izumi Tagoku, Tokyo; Masahiro Ishikawa, Hiratsuka; Takashi Seto, Ayase, all of Japan

[73] Assignee: Ricoh Company, Ltd., Tokyo, Japan

[21] Appl. No.: 731,513

[22] Filed: May 7, 1985

[30] Foreign Application Priority Data

| | | | |
|---|---|---|---|
| May 10, 1984 | [JP] | Japan | 59-93713 |
| May 28, 1984 | [JP] | Japan | 59-106609 |
| May 28, 1984 | [JP] | Japan | 59-106610 |
| May 28, 1984 | [JP] | Japan | 59-106611 |
| May 31, 1984 | [JP] | Japan | 59-111600 |
| May 31, 1984 | [JP] | Japan | 59-111603 |
| Jun. 6, 1984 | [JP] | Japan | 59-115824 |
| Jun. 6, 1984 | [JP] | Japan | 59-115825 |
| Jun. 20, 1984 | [JP] | Japan | 59-126724 |
| Jun. 21, 1984 | [JP] | Japan | 59-126452 |
| Jun. 25, 1984 | [JP] | Japan | 59-130766 |

[51] Int. Cl.$^4$ .................... G03B 27/58; G03G 15/00

[52] U.S. Cl. .................................. 355/72; 156/364; 156/566; 270/37; 355/14 SH; 412/22

[58] Field of Search ................ 355/72, 3 SH, 14 SH, 355/26, 50; 270/53, 32, 37; 271/291; 156/364, 566; 412/22, 37

[56] References Cited

U.S. PATENT DOCUMENTS

| | | | |
|---|---|---|---|
| 4,424,963 | 1/1984 | Bartholet et al. | 270/53 |
| 4,444,491 | 4/1984 | Rinehart et al. | 355/50 |
| 4,479,641 | 10/1984 | Bean et al. | 355/14 SH X |
| 4,497,478 | 2/1985 | Reschenhofer et al. | 355/3 SH X |
| 4,511,297 | 4/1985 | Wilson et al. | 355/14 SH X |
| 4,515,458 | 5/1985 | Masuda et al. | 355/14 SH X |
| 4,540,458 | 9/1985 | Baughmann et al. | 355/14 SH X |
| 4,549,804 | 10/1985 | Braun et al. | 355/14 SH |
| 4,553,828 | 11/1985 | Burger et al. | 355/14 SH X |

*Primary Examiner*—Richard A. Wintercorn

*Attorney, Agent, or Firm*—Oblon, Fisher, Spivak, McClelland & Maier

[57] ABSTRACT

A copier capable of binding copy papers at their center or their edge as desired. A bookbinding device is operatively connected to a paper outlet of the copier. To bind the papers at their center, a folding mechanism of the bookbinding device is activated first in order to form a crease along the center of each copy paper. Then, a binding mechanism of the bookbinding device is activated to sequentially stack the papers in an upwardly convex form and such that the creases face upward in alignment and, then, stich the papers together along the aligned creases by means of a stapler or the like. The bound papers are discharged to a stacking mechanism of the bookbinding device in a developed position so as to be stacked there while being folded double in the creases.

16 Claims, 28 Drawing Figures

COPIER WITH BOOKBINDING FUNCTION

BACKGROUND OF THE INVENTION

The present invention relates to a copier with a both- or double-face copying function, a variable-magnification copying function, and a bookbinding function for binding a stack of copy papers at their center or edge. More particularly, the present invention relates to a copier with a bookbinding ability which allows copies to be selectively bound at their center and edge and, in the former case, stacks the papers folding them double together and, in the latter case, stacks them in a straight position.

In a copier of the type described, where it is desired to produce a plurality of copies for each of a plurality of documents, use has been made of a sorter to sort copies in the order of pages and a stitcher to bind the copies along their aligned edges.

The problem with such a prior art system is that binding or stitching relatively large sheets such as those of format A3 or B4 along their aligned edges results in a booklet which occupies a substantial space or area when opened and, so, is awkward to handle. In addition, while relatively large sheets are sometimes double-folded after being bound along the edge in order to save the space for storage, folding bound sheets double together not only degrades their appearance in storage but also makes information carried in the folded portions difficult to see due to the folds.

Although the problem mentioned above may be overcome by binding papers at their center, binding sheets at the center needs to be preceded by creasing them at the center. Specifically, one approach to bind papers at the center is creasing each paper discharged from a copier by folding it double, stacking the so creased papers over predetermined number of pages, and stitching them along the creases to provide a booklet. However, since the crease varies in position from one size of sheets to another and even from one condition of sheet and document transfer to another, it is difficult to crease and bind many different sizes of sheets together at an exactly desired position. It is also difficult to stack creased sheets one upon another in an ordary appearance.

Furthermore, where copy papers are bound at their center and, then, stacked as they are, the papers pile up in an open position so that one has to pick them out and, thereafter, fold them double by awkward manipulation. As for those papers which were bound at their aligned edges, it is desirable that they be stacked without being bolded double.

In addition, should the bookbinding function be exclusively designed for binding papers at the center, the need for binding papers at an edge which often arises could not be satisfied without using an exclusive edge binding device at the cost of performance.

SUMMARY OF THE INVENTION

It is an object of the present invention to provide a copier with a center binding ability, an edge binding ability and other bookbinding abilities as well as a double-face copying ability and a variable-magnification copying ability.

It is another object of the present invention to provide a copier with a bookbinding ability which is capable of selectively performing center binding after creasing and stacking papers one by one and edge binding which shares the same instrument with the center binding.

It is another object of the present invention to provide a copier with a bookbinding ability which creases copy papers one by one which underwent a copying process, sequentially stacks the creased papers in an angled form, and binds the stack without changing the angled configuration.

It is another object of the present invention to provide a copier with a bookbinding ability which is capable of locating all the creases accurately in a binding position even though the position of the crease differs from one paper size to another.

It is another object of the present invention to provide a paper folding device for a copier having a bookbinding ability which causes papers to be creased one by one exactly at the center thereof.

It is another object of the present invention to provide a stacking device for a copier having a bookbinding ability which allows center-bound papers to be stacked double-folded and edge-bound ones non-folded, in a single stack section.

It is another object of the present invention to provide a generally improved copier with a bookbinding function.

A copier having a function of binding copy papers of the present invention comprises a copying device including an inverting mechanism for inverting the copy papers each carrying a copied image on one face thereof, and an intermediate tray for temporarily storing the copy papers to prepare for duplication on the other faces of the copy papers, a recirculation type document handling device including a document tray for accommodating documents, and an inverting mechanism neighboring a glass platen of the copying device, the document handling device returning the documents fed out of the document tray back to the document tray after both faces, if necessary, of the documents have been illuminated by the copying device, and a bookbinding device conjugate with a transport path along which the copy papers are discharged from the copying device, the bookbinding device including a folding mechanism for creasing each of the copy papers at a central portion, and a binding mechanism conjugate with the folding mechanism.

In accordance with the present invention, a copier capable of binding copy papers at their center or their edge as desired is provided. A bookbinding device is operatively connected to a paper outlet of the copier. To bind the papers at their center, a folding mechanism of the bookbinding device is activated first in order to form a crease along the center of each copy paper. Then, a binding mechanism of the bookbinding device is activated to sequentially stack the papers in an upwardly convex form and such that the creases face upward in alignment and, then, stich the papers together along the aligned creases by means of a stapler or the like. The bound papers are discharged to a stacking mechanism of the bookbinding device in a developed position so as to be stacked there while being folded double in the creases.

The above and other objects, features and advantages of the present invention will become more apparent from the following detailed description taken with the accompanying drawings.

DESCRIPTION OF THE PREFERRED EMBODIMENTS

While the copier with a bookbinding function of the present invention is susceptible of numerous physical embodiments, depending upon the environment and requirements of use, substantial numbers of the herein shown and described embodiments have been made, tested and used, and all have performed in an eminently satisfactory manner.

Figure 1:
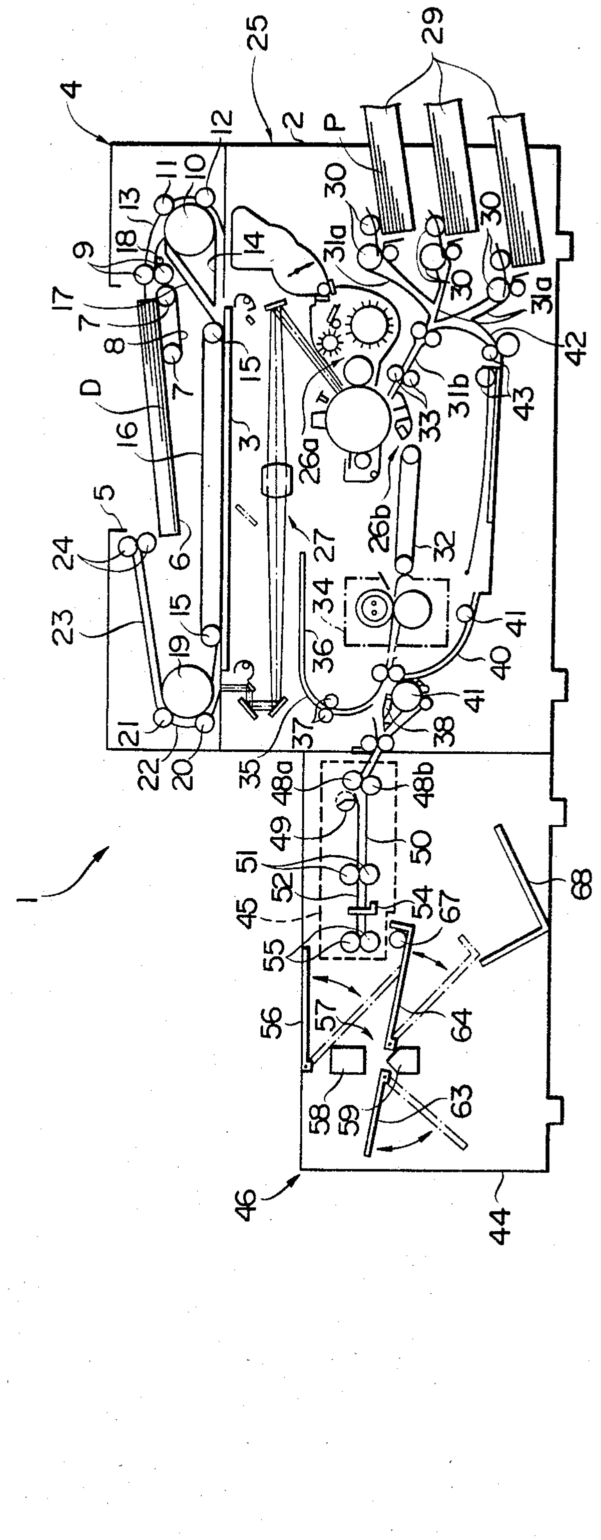
FIG. 1 is a schematic front view of a copier embodying the present invention.

Referring to FIG. 1 of the drawings, a copier embodying the present invention is shown and generally designated by the reference numeral 1. The copier 1 comprises a casing 2, a glass platen 3 extending horizontally in an upper portion of the interior of the casing 2, and a recirculation type document handling device 4 located inside the casing 2 and above the glass platen 3.

The document handling device 4 includes a document tray 6 which is located to face a top opening 5 of the casing 2 and substantially right above the glass platen 3. At one end, the document tray 6 is provided with an opening through its bottom wall. A feed belt 8 passed over a pair of pulleys 7 faces the opening of the document tray 6 in such a manner as to feed a stack of documents D one by one from the lowest one out of the document tray 6, to the right as viewed in FIG. 1. A pair of separation rollers 9 are disposed at the right of the feed belt 8 so as to prevent a document overlying the lowest one from being fed together with the latter. A roller 10 having a relatively large diameter is located at the right of and obliquely below the separation rollers 9 to redirect the document D as will be described. A plurality of rollers 11 and 12 are pressed against the roller 10 to transport the dcument D along the roller 10, while the arcutate passageway 13 is defined along the periphery of the roller 10. The passageway 13 merges into a horizontal passageway 14 which extends from the lower end of the roller 10 to the glass platen 3. A conveyor belt 16 is passed over a pair of pulleys 15 above the glass platen 3 and held in pressing contact with the glass platen 3. An inclined inverting passageway 17 provides communication between the passageway 13 adjacent to the separation rollers 9 and the end portion of the glass platen 3. Disposed in the vicinity of the rollers 9 is a pawl member 18 adapted to block one of the passageways 13 and 17.

At the left end of the glass platen 3, a roller 19 having a relatively larger diameter is located. A plurality of rollers 10 and 21 are pressed against the periphery of the roller 19 so as to drive the document D on the glass platen 3 along the roller 19. An arcuate passageway 22 is defined along the periphery of the roller 19 and merges at its trailing end into a passageway 23 adapted to return the document D to the document tray 6. Located at the trailing end of the passageway 23 are a pair of rollers 24 which serve to discharge the document D from the passageway 23 onto the document tray 6.

With such a document handing device 4, the copier 1 is capable of illuminating both faces of each document D in a continuous fashion. Specifically, a document D fed to the glass platen 3 from the tray 6 to have its one face exposed may be transported through the passageways 14, 13 and 17 in this sequence by shifting the pawl member 18 from the illustrated position and driving the conveyor belt 16 in the opposite direction, so that the document D is inverted while moving around the roller 10 and, then, stopped again on the glass platen 3 to have its other face illuminated.

A copying device, generally 25, is provided with a magnification changing function and located below the glass platen 3 inside the casing 2. The copying device 25 includes a developing station 26*a* and a transfer station 26*b*. Disposed in the developing tation 26*a* is a photosensitive drum 28 adapted to form an electrostatic latent image thereon when exposed to light which is reflected from the document D on the glass platen 3 and, then, passed through an optical arrangement 27. While various chargers, a cleaning unit and others are arranged in sequence around the drum 28, they are essentially the same as those installed in ordinary copiers and, therefore, will not be described herein for simplicity.

A plurality of paper cassettes 29 are loaded in the casing 2 through one end wall of the latter. Rollers 30 are positioned in the casing 2 and associated with each paper cassette 29 to feed papers P one by one out of the cassette 29. Passageways 31*a* extend out from the respective paper cassettes 29 so that papers P fed out of the associated cassettes 29 may advance therethrough. The passageways 31*a* merge into a passageway 31*b* which terminates at the transfer station 26*b*. Transfer rollers 33 are arranged in the passageway 31*b*. A conveyor belt 32 faces the vicinity of the transfer station 26*b* at one end thereof so as to convey the paper P to which a toner image has been transferred at the transfer station 26*b*. Located at the other end of the belt 32 is a fixing station 34 adapted to fix the toner image on the paper P.

Located at the downstream of the fixing station 34 is an inverting station 35 which includes an upwardly bent passageway 36, and rollers 37 disposed in the passageway 36. The paper P enters the inverting station 35 at its leading end and leaves it at its trailing end to be thereby inverted. A pawl member 38 is positioned adjacent to the inverting station 35 to direct the paper P from the fixing station 34 toward the inverting station 35 or a folding mechanism 45, which is installed in another casing 44 as will be described. An intermediate tray 39 is located in a lower portion of the casing 2 in order to temporarily store the paper P which has been inverted at the inverting station 35. The transfer of the paper P from the inverting station 35 to the intermediate tray 39 is implemented by a passageway 40 which is provided with conveyor rollers 41. It is also possible to steer the paper P from the fixing station 34 toward the intermediate tray 39 through the passageway 40 without introducing it into the inverting station 35.

Arranged at the front end of the intermediate tray 39 are rollers 43 which serve to feed the papers P one by one, first the uppermost, out of the intermediate tray 39. Each paper P fed out of the tray 39 is again routed to the transfer station 26*b* by a passageway 42 which joins the passageway 31*b*.

The copier 1 will be operated as follows to duplicate images on both faces of a paper P. The pawl 38 is actuated to an upright position so that a paper P from the fixing station 34 may be directed toward the inverting station 35, whereafter a predetermined button (not shown) is depressed. Then, light which has scanned a document D on the glass platen 3 and, then, passed through the optical arrangement 27 is focused to the drum 28 to provide a latent image thereon. The latent image is developed by a toner at the developing station 26*a*. Meanwhile, a paper P fed out of a selected paper cassette 29 is transported through the passageways 31*a* and 31*b* to the transfer station 26*b*, the toner image then being transferred from the drum 28 to the paper P. The paper P is processed at the fixing station 34 to fix the image thereon and, then, introduced into the passageway 36 of the inverting station 35. As soon as the whole paper P enters the passageway 36, the rollers 37 are driven in the opposite direction to transport the paper P into the passageway 40 from the trailing end, the passageway 40 terminating at the intermediate tray 39. The paper P thus laid on the intermediate tray 39 carries the image on its upper face. After a desired number of papers P each carrying an image on one face thereof have been stacked on the intermediate tray 39, they are fed thereoutof one by one toward the transfer station 26*b* so that other images may be transferred to the other faces. At this instant, the pawl member 38 has been shifted to the position shown in FIG. 1 so that each paper P carrying images on both faces therof is steered from the fixing station 34 toward the folding mechanism 45.

When it is desired to copy images on one face of a paper P only, the pawl member 38 will be kept in the position shown in FIG. 1 from the start.

Figure 2:
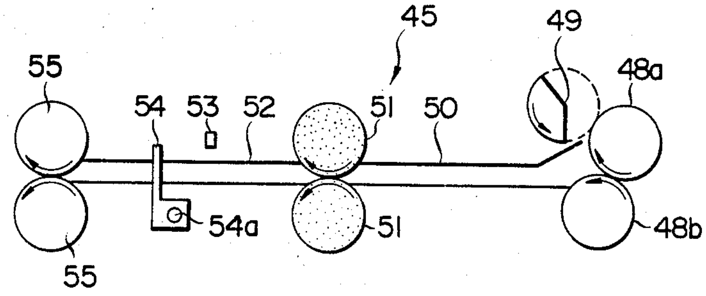
FIG. 2 is an enlarged view of a folding mechanism included in the copier of FIG. 1.

The folding mechanism 45 is adapted to bind papers P at the center (this binding mode will hereinafter be referred to as center-binding) and functions to crease a sheet P at the center before a binding operation. The mechanism 45 is installed in the casing 44 of a bookbinding device 46, which is removable from the casing 2. As shown in detail in FIG. 2, the folding mechanism 45 is delimited at one or inlet end by a pair of conveyor rollers 48*a* and 48*b*. A sector roller 49 is located downstream of the rollers 48*a* and 48*b* and engageable with one, 48*a*, of the rollers. As shown, the periphery of the sector roller 49 extends over only a limited angular distance in the circumferential direction (about 120 degrees in this particular embodiment). A passageway 50 extends from a position downstream of the rollers 48*a* and 48*b*. At the upstream end, the passageway 50 is inclined upwardly toward the point where the rollers 48*a* and 49 are engageable, so that a paper P may be nipped between the rollers 48*a* and 49. At the other or downstream end of the passageway 50, a pair of sponge rolls 51 are positioned. A passageway 52 emerges from the sponge rolls 51 away from the passageway 50.

Disposed at a side of the passageway 52 is a sensor 53 sensitive to presence/absence of a paper P. An arrangement is made such that as the sensor 53 senses a sheet P the sector roller 49 is rotated one full rotation as indicated by an arrow in FIG. 2. A stop 54 faces the passageway 52 at the downstream of the sensor 53 and is movable about a shaft 54*a* to and from a retracted position as will be described. The other or downstream end of the passageway 52 is delimited by a pair of conveyor rollers 55. The stop 54 may be provided in a number commensurate with the sizes of sheets P or may be arranged movable to match with a particular size of sheets P.

The sponge rolls 51 serve to press a paper P such that only a central portion of the sheet P warps toward the engaging portion between the rollers 48*a* and 49 under the condition wherein the leading end of the paper P has abutted against the stop 54. In this regard, it is preferable that the sponge rolls 51 exert a relatively weak driving force and rotate at a certain peripheral speed which is somewhat higher than that of the rollers 48*a* and 48*b*. The sponge rollers 51 may be provided in a plurality of pairs to accommodate different sheet sizes.

Figure 3A:
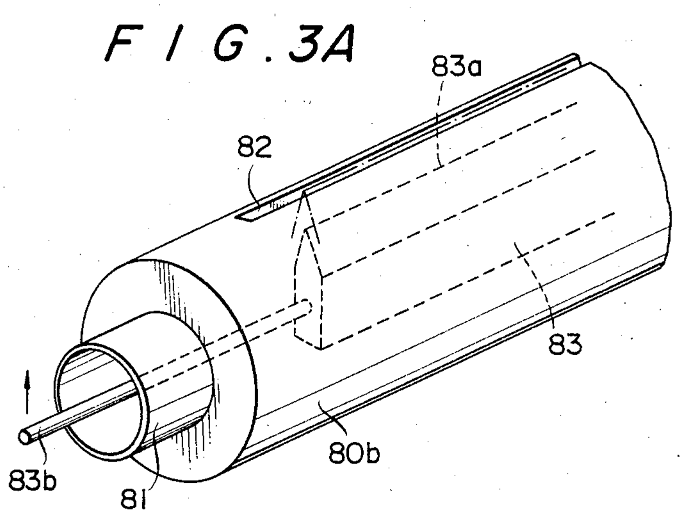
FIG. 3A is an enlarged fragmentary perspective view of a folding roller which represents another example of the folding mechanism.
Figure 3B:
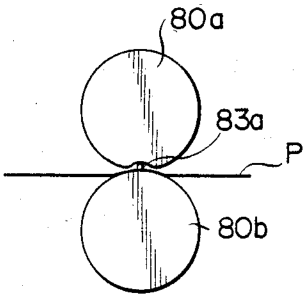
FIG. 3B is a schematic illustration of the operation of the folding roller shown in FIG. 3A.

As shown in FIGS. 3A and 3B, the sponge rolls 51 and sector roller 49 may be replaced by a pair of folding rollers 80*a* and 80*b* which are engaged with each other and located between the stop 54 and the rollers 55 in the passageway 50. As shown in detail in FIG. 3A, the lower folding roller 80*b* is hollow and provided with tubular projections 81 (only one is shown) at axially opposite ends thereof. The projections 81 are rotatably supported by bearings (not shown). A slot 82 extends axially through the hollow roller 80*b* over a distance which is greater than the width of the largest allowable format of sheets P. A flat creasing member, or plate, 83 is disposed in the hollow roller 80*b* and provided with an edge-shaped projection 83*a* at its top. The plate 83 is rigidly supported by a shaft 83*b* which protrudes from the opposite tubular extensions 81 of the roller 80*b*. The shaft 83*b* is rotatable in synchronism with the folding roller 80*b* so that the projection 83*a* of the plate 83 may constantly be aligned with the slot 82. In this construction, when the shaft 83*b* is shifted in the radial direction of the roller 80*b*, the projection 83*a* of the plate 83 will protrude from the roller 80*b* through the slot 82.

Meanwhile, the the other folding roller 80*a* engaged with the roller 80*b* is made of an elastic material so that, when the edge 83*a* of the plate 83 is brought into pressing contact with the roller 80*a*, the latter may be deformed as shown in FIG. 3B. In this case, the stop 54 is constructed to temporarily stop the movement of the paper P in order to time the transport of the sheet P and the rotation of the rollers 80$a$ and 80$b$ such that the central portion of the paper P becomes aligned with the roller 80$b$. In this particular embodiment, after the stop 54 has retained the paper P, the conveyor rollers 48$a$ and 48$b$ are inhibited from rotating until the stop 54 is brought back to its retraction position.

It will be noted that the means for creasing papers P and means for redriving the papers P installed in the folding mechanism 45 are not limited to those shown and described and may be replaced with other suitable ones.

Figure 4:
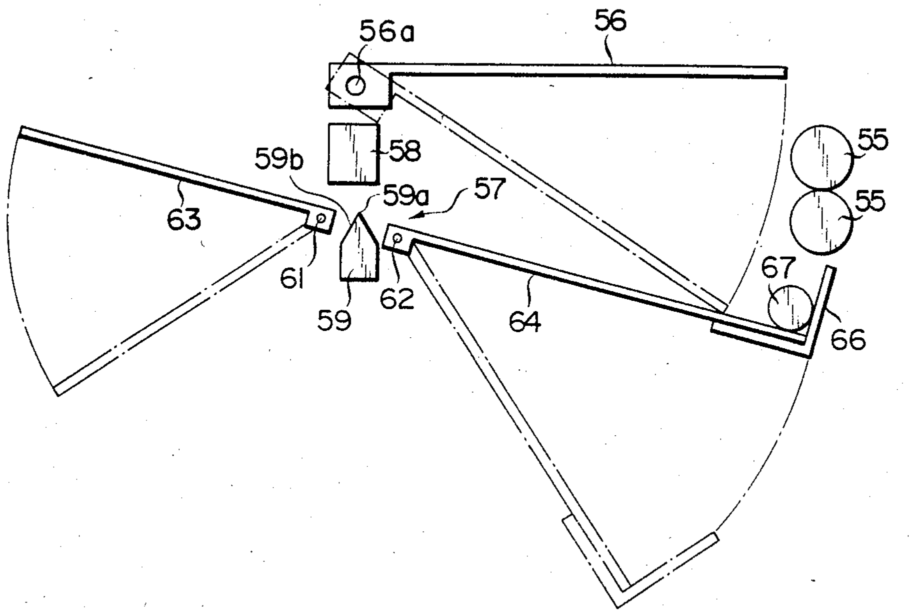
FIG. 4 is an enlarged view of a binding mechanism also included in the copier of FIG. 1.

A non-bind tray 56 is installed in the casing 44 downstream of the conveyor rollers 55. As shown in FIG. 4, the tray 56 is movable about a shaft 56$a$ between a first position indicated by a solid line and a second position indicatd by a phantom line. In the phantom line position, the tray 56 receives papers P which do not need binding and come out of the folding mechanism 45. When papers P which need binding come out of the folding mechanism 45, the tray 56 will be retracted upward to the solid line position.

Figure 5:
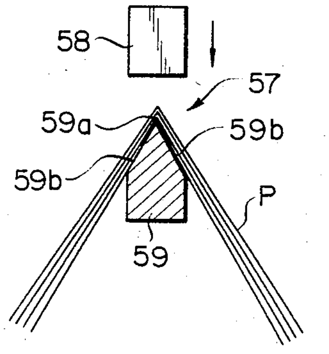
FIG. 5 shows the operation of the binding mechanism of FIG. 4.

A binding mechanism 57 is located below the non-bind tray 56 in the casing 44. The binding mechanism 57 comprises a support member 59 and a stapler or like binding member 58 located above the support member 59. The support member 59 is constructed and arranged such that a paper P which has been creased by the folding section 45 straddles the support member 59 with its crease faced upward. Specifically, as shown in FIG. 5, the support member 59 has a sharp upper edge 59A for supporting the crease of the paper P from below, and slants 59$b$ which join each other along the edge 59$a$, thereby supporting the paper P in an upwardly convex form. The upper edge 59A is partly configured to serve as a seat for bearing a stitching member (wire or needle-shaped member) when the binding member 58 is activated.

A guide plate 63 is positioned at one side of the support member 59 adjacent to one of the slants 59B and is swingable about a shaft 61. Likewise, a guide plate 64 is positioned at the other side of the support member 59 adjacent to the other shaft 59$b$ and is swingable about a shaft 62. The guide plates 63 and 64 are individually movable to a horizontal position as indicated by solid lines in FIG. 4, and to an angled position where they provide a conical section as indicated by a phantom line. Further, the guide plate 63 is movable upward to a third position where it becomes substantially coplanar with the guide plate 64 which is kept in the angled position. Both the guide plates 63 and 64 are capable of being fixed in place in each of those positions. For this purpose, suitable means for locking the shafts 61 and 62 associated with the plates 63 and 64 may be used.

Figure 6:
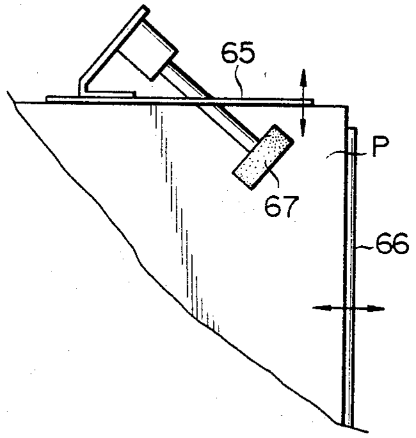
FIG. 6 is a fragmentary plan view of the binding mechanism shown in FIG. 4.
Figure 7:
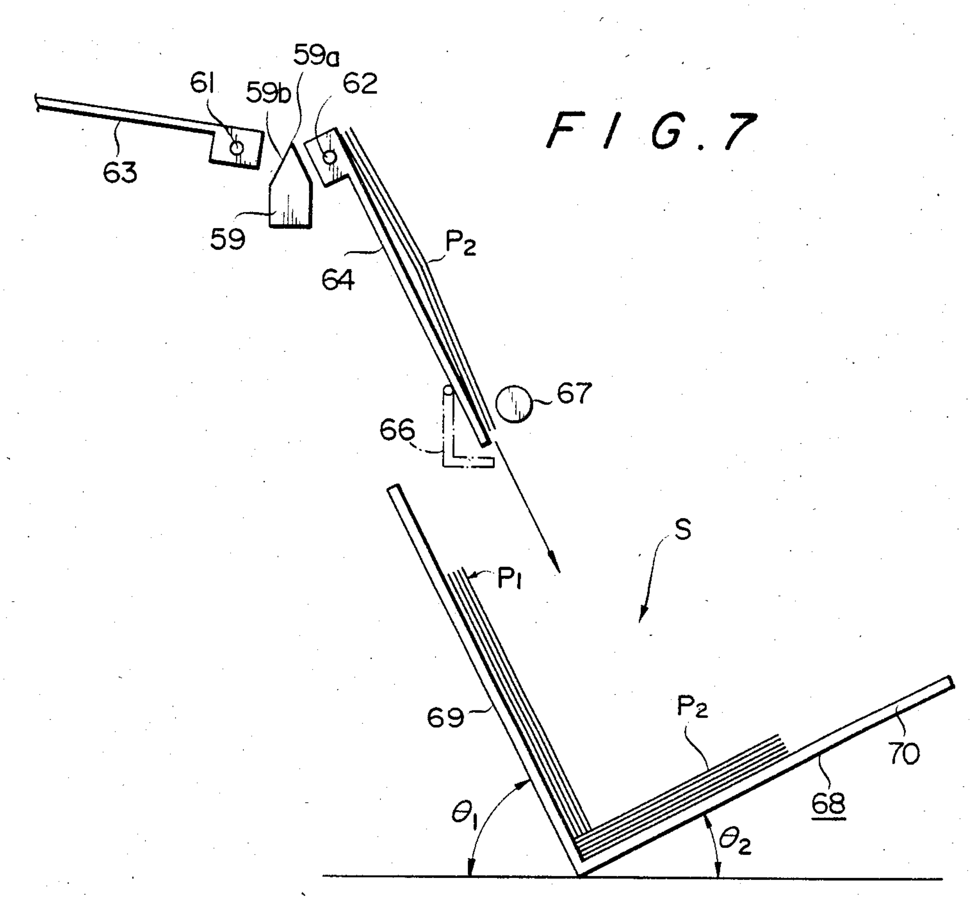
FIG. 7 shows in a front view a relationship between the binding mechanism of FIG. 6 and a tray.

As shown in FIG. 6, a wall or plate 65 is positioned upright at one side of the guide plate 64 in such a manner as to be movable as indicated by an arrow in FIG. 6 depending upon the paper size. The guide plate 64, on the other hand, carries a wall or plate 66 at its free end. The wall 66 is movable in a direction perpendicular to the axis of the shaft 62. Such a construction may be accomplished by configuring the base portion of the wall 66 and the guide plate 64 in intermeshing comb-like shapes. As shown in FIG. 7, the wall 66 on the guide plate 64 is movable to a retracted position as indicated by a phantom line. A roll 67 extends outwardly from the wall 65 to press itself against and roll on the paper P on the guide plate 64, thereby causing two adjacent sides of the sheet P to abut against the walls 65 and 66. The roll 67 has an axis which intersects the axis of the shaft 62, and is movable toward and away from the paper P on the guide plate 64.

Figure 8A:
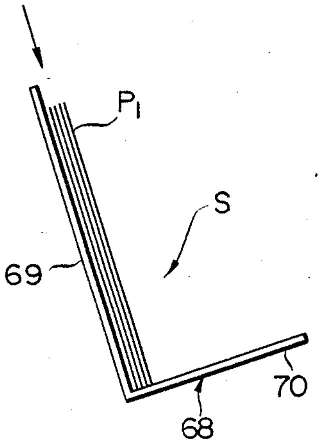
FIGS. 8A and 8B show papers bound along an edge and those bound at the center each in a stacked position.
Figure 8B:
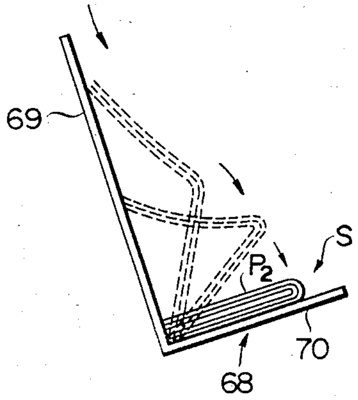

As shown in FIG. 7, a tray 68 which constitutes a stack station S is positioned below the guide plate 64. The tray 68 has two sides 69 and 70 which provide a generally L-shaped cross-section. The side 69 is positioned at an acute angle $\theta_1$ to the bottom of the casing 44, and the side 70 an acute angle $\theta_2$. The angles $\theta_1$ and $\theta_2$ are selected such that edge-bound papers $P_1$ remain in an upright position along the side 69 of the tray 69 as shown in FIG. 8A, while center-bound papers $P_2$ collapse due to thickness and weight to be stacked on the side 70 as shown in FIG. 8B. The tray 68 is adjustable to select the angles $\theta_1$ and $\theta_2$ of the sides 69 and 70 optimumly.

The bookbinding device 46 made up of the folding mechanism 45 and binding mechanism 57 as described above will be operated as follows for binding the papers P.

Assume that a predetermined number of papers P coming out of the copying device are to be bound at their center, or center-bound. The leading end of a paper P conveyed from the fixing station 34 to the folding mechanism 45 is passed through the conveyor rollers 48$a$ and 48$b$ and sponge rolls 51 until it abuts against the stop 54, which has been conditioned to match with a particular size of the sheet P. Although the sponge rolls 51 continue to rotate, their force acting on the paper P is too weak to deform the paper P. As the paper P is continuously driven by the rollers 48$a$ and 48$b$, it begins to warp in a portion adjacent to the end of the passageway 50. At this time, the sector roller 49 peforms one full rotation timed to an output of the sensor 53 which has sensed the paper P, whereby the warped paper P is nipped between the rollers 48$a$ and 49 to be creased at its center. Although the part of the roller 49 other than the sectoral part soon comes to face the roller 48$a$, the stop 54 retracts from the passageway 52 therebefore. Hence, as soon as the sectoral part of the roller 49 moves past the roller 48$a$, the paper P having been creased at the center is freed from the driving force of the roller 48$a$ and, instead, subjected to the driving force of the sponge rolls 51 to be thereby transported to the binding mechanism 57 by way of the rollers 55.

The binding operation using the folding rollers 80$a$ and 80$b$ shown in FIGS. 3A and 3B will be described. The leading end of the paper P fed from the fixing station 34 to the folding mechanism 45 is passed through the conveyor rollers 48$a$ and 48$b$ until it abuts against the stop which, as previously mentioned, has been arranged to match with a particular size of the paper P. When the paper P has been stopped with its leading end abutted against the stop 54, the sensor 53 senses it to deactivate the rollers 48$a$ and 48$b$. Even in this condition, the folding rollers 80$a$ and 80$b$ are continuing their rotation. When the slot 82 of the folding roller 80$b$ has aligned with the paper P at such a timing that the paper P advanced by the rollers 48$a$ and 48$b$ and rollers 80$a$ and 80$b$ reaches a position where its center comes comes o align with the rollers 80$a$ and 80$b$, the stop 54 is displaced to the retracted position and the rollers 48$a$ and 48$b$ are driven again to feed the paper P to the left. As soon as the center of the paper P reaches the position between the folding rollers 80$a$ and 80$b$, the edge-like projection 83$a$ of the plate 83 protrudes through the slot 82 of the roller 80$b$ until, as shown in FIG. 3B, it abuts against the elastic roller 80*a*. *l The projection 83a* creases the center of the paper P while deforming the roller 80*a*. Thereafter, the projection 83*a* immediately retracts into the roller 80*b* and, therefore, does not interfere with the rotation of the rollers 80*a* and 80*b*.

The paper P creased at its center as described is driven by the folding rollers 80*a* and 80*b* and the conveyor rollers 55 toward the binding mechanism 57.

At the instant when the centrally creased paper P enters the mechanism 57, the guide plates 63 and 64 have been positioned as indicated by solid lines in FIG. 4, that is, thay are coplanar with each other in such a position that the free end of the guide plate 64 is positioned somewhat below the rest. In the meantime, the non-bind tray 56 is kept in the solid line position of FIG. 4.

The papers sequentially laid on the guide plates 63 and 64 are shifted one by one by the roll 67 into abutment against the walls 65 and 66. After all the papers P which are expected to complete one booklet has been stacked on the guide plates 63 and 64 while having been positioned as mentioned above, the wall 66 is moved toward the shaft 62 until the creases of the papers P become aligned with the edge 59A of the support member 59. Then, the guide plates 63 and 64 are actuated to the phantom line positions as shown in FIG. 4. This causes the papers P to be born by the slants 59B of the support member 59 and the creases of the papers P to be alined along the edge of te projection edge 59A. In this condition, the binding member 58 is lowered to stitch the papers P together along the aligned creases. Finally, the guide plate 63 is moved back to the phantom line position and the wall 66 is retracted, whereby the bound papers P slip down along the guide plate 64 into the tray 68 to be stacked on the side 70 while being double-folded along the aligned creases due to gravity.

Why the papers P are fed longitudinally in the embodiments described will be explained.

Where the paper size is double the document size, papers P cannot be center-bound unless they are fed perpendicularly to the documents D. Where the documents D are fed longitudinally, therefore, the papers P have to be fed transversely. The prerequisite here is that since documents D are sometimes duplicated on both the right and left halves of papers P, the documents D or the papers P are shifted either to the right or to the left with respect to the feed direction depending upon the page of the document D. So shifting the documents D or the papers P cannot be accomplished without relying on an intricate construction.

On the other hand, where the documents D are fed transversely, the papers P have to be fed longitudinally. This is rather advantageous over the first case wherein the documents are fed longitudinally and the papers transversely, because the direction in which the documents D should be shifted in the event of copying is the same as the feed direction of the documents D and papers P. It follows that neither the documents D nor the papers P do not need to be shifted to the right or the left as would otherwise be practiced to align the documents D and the papers D. What is required is simply varying the timing to transfer a toner image from the drum 28 to a paper P or the stopping position of a document D on the glass platen 3, thereby varying a transfer position of the document D on the paper P.

As discussed above, feeding papers P longitudinally is advantageous over feeding them transversely in view of the simplicity of construction and, therefore, easiness of manipulation. Hence, the crease in the papers P in the folding mechanism 45 is provided perpendicularly to the feed direction of the papers P, because it is formed in the papers P which are fed longitudinally.

The papers P are bound at their aligned edges as will be described. In response to an edge-bind mode command, the stop 54 in the folding mechanism 45 is retracted to unblock the paper P. The papers P are sequentially stacked on the horizontal guide plates 63 and 64 with their binding edges aligned by the wall 66, whereafter the binding member 58 is lowered to stich the aligned edges of the papers P. Then, the guide plate 64 is lowered and the guide plate 63 raised. This causes the bound papers P to slip down along the guide plate 64 into the tray 68 as during the center-binding but, this time, maintains the papers P substantially upright along the side 69 of the tray 68.

As described above, the present invention is capable of binding papers at their center using the recirculation type document handling device 4, copying device 25 and bookbinding device 46. In the case of the center-binding, a consideration should constantly be given to the positions of documents D to be duplicated on papers P. In this connection, the copying sequence and the like will be explained next.

Figure 9:
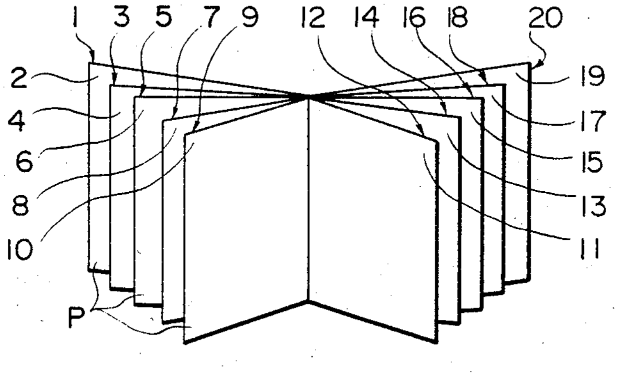
FIG. 9 shows an an exemplary booklet prepared by binding papers.

Referring to FIG. 9, there is shown a booklet produced by copying twenty pages of documents on five papers P and, then, binding the papers at their center. Pages 1, 2, 19 and 20 the documents D are reproduced on a single paper P. This relation also holds true with the other pages of the documents D.

Center-bound booklets may be classified by the direction of writing, i.e. horizontal writing and vertical writing; copies corresponding to vertically written documents will be bound from the right and those corresponding to horizontally written documents, from the left. Further, center-bound booklets may be classified by presence/absence of a cover, magnifications (x1 and others), etc.

Concerning center-binding which is effected with x1 magnification, documents D and papers P will be combined as tabulated below.

(I) When the sheet size is double the document size

TABLE 1

| ONE-FACE DOCUMENT | | DOUBLE-FACE DOCUMENT | |
|---|---|---|---|
| DOCUMENT | PAPER | DOCUMENT | PAPER |
| A4 transverse feed | A3 longitudinal feed | A4 transverse feed | A3 longitudinal feed |
| B5 transverse feed | B4 longitudinal feed | B5 transverse feed | B4 longitudinal feed |

Figure 10:
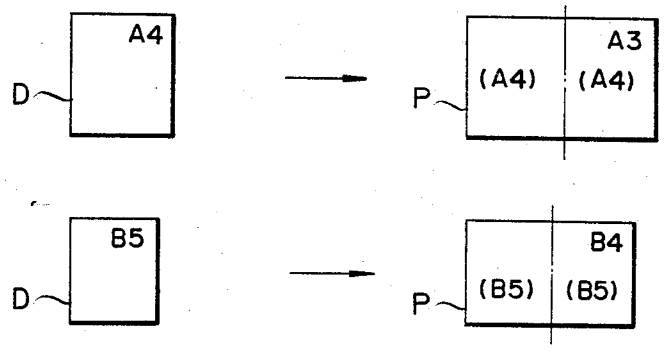
FIGS. 10, 11 and 12A–12C show various combinations of documents and papers.

The word "longitudinal" implies that documents D or papers P are fed with their shorter edges positioned perpendicular to the feed direction, while the word "transverse" implies that they are fed with their longer edges positioned perpendicular to the feed direction. The combinations shown in Table 1 are illustrated in FIG. 10.

(II) When the sheet size equal to the document size

TABLE 2

| ONE-FACE DOCUMENT | | DOUBLE-FACE DOCUMENT | |
|---|---|---|---|
| DOCUMENT | PAPER | DOCUMENT | PAPER |
| A3 longitudinal feed | A3 longitudinal feed | A3 longitudinal feed | A3 longitudinal feed |

TABLE 2-continued

| ONE-FACE DOCUMENT | | DOUBLE-FACE DOCUMENT | |
|---|---|---|---|
| DOCUMENT | PAPER | DOCUMENT | PAPER |
| B4 longitudinal feed | B4 longitudinal feed | B4 longitudinal feed | B4 longitudinal feed |
| A4 longitudinal feed | A4 longitudinal feed | A4 longitudinal feed | A4 longitudinal feed |
| B5 longitudinal feed | B5 longitudinal feed | B5 longitudinal feed | B5 longitudinal feed |

Figure 11:
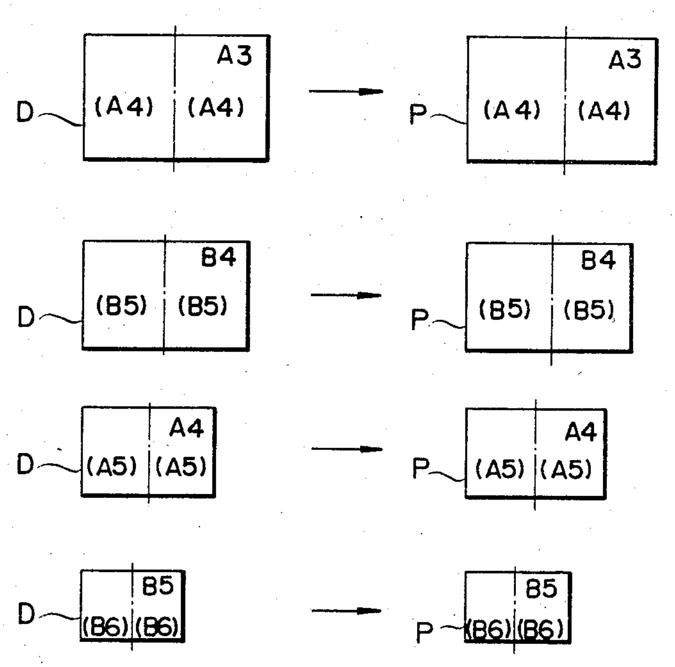

The combinations shown in Table 1 are illustrated in FIG. 11.

Table 3 shown below represents combinations of documents D and papers P and their associated magnifications which apply to a case wherein center-binding is effected with magnifications other than x1.

TABLE 3

| | PAPER | | | |
|---|---|---|---|---|
| DOCUMENT | A3 LONGITUDINAL FEED | B4 LONGITUDINAL FEED | A4 LONGITUDINAL FEED | B5 LONGITUDINAL FEED |
| A3 LONGITUDINAL FEED | | 87% | 71% | 61% |
| B4 LONGITUDINAL FEED | 115% | | 82% | 71% |
| A4 LONGITUDINAL FEED | 141% | 122% | | 87% |
| B5 LONGITUDINAL FEED | 163% | 141% | 115% | |
| A4 TRANSVERSE FEED | | 87% | 71% | 61% |
| B5 TRANSVERSE FEED | 115% | | 82% | 71% |

Figure 12A:
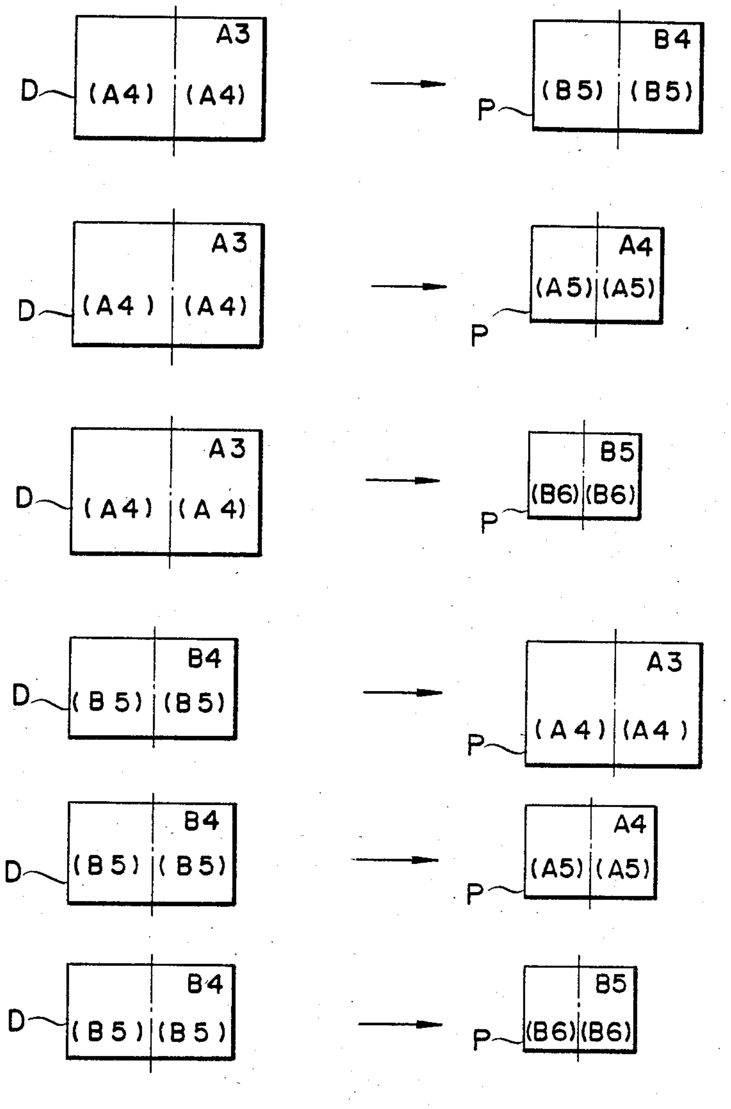
Figure 12B:
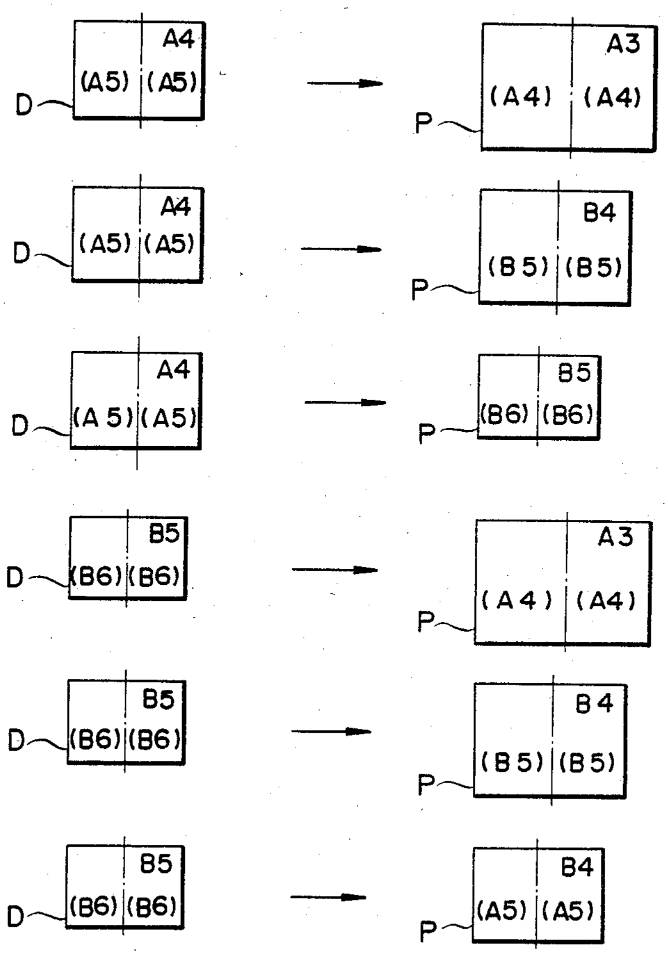
Figure 12C:
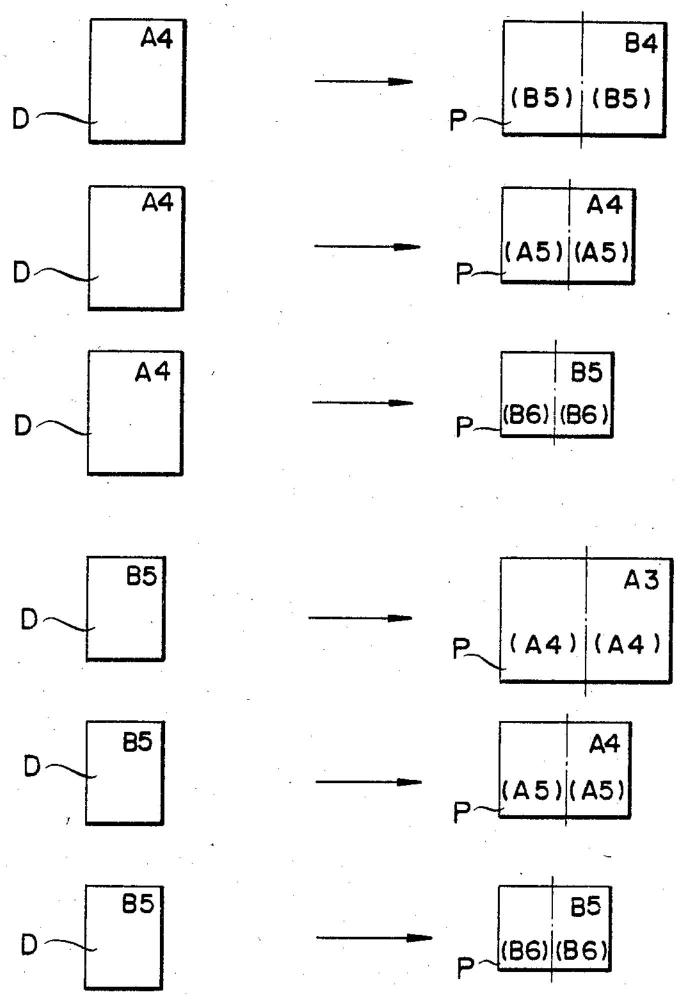

The same relationship applies to a case wherein the document D is double-faced. Such is shown in FIGS. 12A–12C.

The feed directions of documents D and papers P relating to the previously discussed center-binding may be summed up as shown in Table 4.

TABLE 4

| | PAPER | | | |
|---|---|---|---|---|
| DOCUMENT | A3 LONGITUDINAL FEED | B4 LONGITUDINAL FEED | A4 LONGITUDINAL FEED | B5 LONGITUDINAL FEED |
| A3 LONGITUDINAL FEED | equal | reduce | reduce | reduce |
| B4 LONGITUDINAL FEED | enlarge | equal | reduce | reduce |
| A4 LONGITUDINAL FEED | enlarge | enlarge | equal | reduce |
| A4 TRANSVERSE FEED | equal | reduce | reduce | reduce |
| B5 LONGITUDINAL FEED | enlarge | enlarge | enlarge | equal |
| B5 TRANSVERSE FEED | enlarge | equal | reduce | reduce |

Next, a consideration will be given to the pages of documents D and those of papers P. Generally, when documents comprise n one-faced leaves, the total number of pages will also be n; when the former comprises n double-faced leaves, the latter will be 2n. However, so far as center-binding is concerned, such does not hold true depending upon the combination of a document D and papers P. Specifically, concerning center-binding, the size of a paper which is double-folded at the center of the longer sides, i.e., half the size of the paper P, corresponds to one page on the paper P, and the document information reproduced in the one page of the paper P corresponds to one page of the document. For example, assuming that m longitudinally fed A3 documents each being one-faced are reproduced as a center-bound booklet of longitudinally fed A3 papers, an example of x1 magnification copying, a paper size corresponding to one page of sheet P and one page of document D is A4 and, therefore, the total number of document pages is 2m.

In the case where copies are produced with magnifications other than x1 and bound at the center, too, the document size to be reproduced on half the size of a paper P corresponds to one page of document D. As for center-binding with respect to n documents D, how the total number of pages of documents D will be affected by the combination of documents D and papers P is shown below in Table 5 in matching relation with the previously shown magnification table.

(i) n one-faced documents

TABLE 5

| | PAPER | | | |
|---|---|---|---|---|
| | A3 LONGITUDINAL | B4 LONGITUDINAL | A4 LONGITUDINAL | B5 LONGITUDINAL |
| | PAPER SIZE | | | |
| DOCUMENT | A4 | B5 | A5 | B6 |
| A3 LONGITUDINAL FEED | 2n pages | 2n pages | 2n pages | 2n pages |
| B4 LONGITUDINAL FEED | 2n pages | 2n pages | 2n pages | 2n pages |
| A4 LONGITUDINAL FEED | 2n pages | 2n pages | 2n pages | 2n pages |
| A4 TRANSVERSE FEED | n pages | n pages | n pages | n pages |
| B5 LONGITUDINAL FEED | 2n pages | 2n pages | 2n pages | 2n pages |
| B5 TRANSVERSE FEED | n pages | n pages | n pages | n pages |

(ii) n double-faced documents

TABLE 6

| | PAPER | | | |
|---|---|---|---|---|
| | A3 LONGITUDINAL | B4 LONGITUDINAL | A4 LONGITUDINAL | B5 LONGITUDINAL |
| | PAPER SIZE | | | |
| DOCUMENT | A4 | B5 | A5 | B6 |
| A3 LONGITUDINAL FEED | 4n pages | 4n pages | 4n pages | 4n pages |
| B4 LONGITUDINAL FEED | 4n pages | 4n pages | 4n pages | 4n pages |
| A4 LONGITUDINAL FEED | 4n pages | 4n pages | 4n pages | 4n pages |
| A4 TRANSVERSE FEED | 2n pages | 2n pages | 2n pages | 2n pages |
| B5 LONGITUDINAL FEED | 4n pages | 4n pages | 4n pages | 4n pages |
| B5 TRANSVERSE FEED | 2n pages | 2n pages | 2n pages | 2n pages |

Concerning center-binding, a required number of papers P and which pages will appear on the innermost paper P of a booklet are a very important consideration. To determine a required number of papers P, it is necessary to obtain the total number of pages of documents D as well as the number of documents D. Tow approaches are conceivable to achieve the the above objective, i.e., entry of a number of documents by an operator, and automatic entry of the same.

Of the above two approaches, the automatic scheme may be accomplished by feeding documents D once by the recirculation type document handling device 4 before starting on an actual copying operation so as to count the documents. The number n of documents thus obtained will in turn give the total number of pages of the documents D based on the combinations of documents D and papers P shown in Table 6. Assuming that the total number of pages of documents D is N, the necessary number I of papers P is produced by:

$$N/4 \leqq I \leqq N/4+1 \qquad \text{Eq. (1)}$$

where N and I are positive integers.

The Eq. (1) determines the reqired number I of papers P for the total number of pages N of documents D. The next step is determining which page of the documents D will be duplicated on which paper P.

Assuming an integer i which is larger than 0 and equal to or smaller than I, the i-th paper P, or paper i, will have pages arranged thereon as follows.

(i) Horizontally written documents

Figure 13:
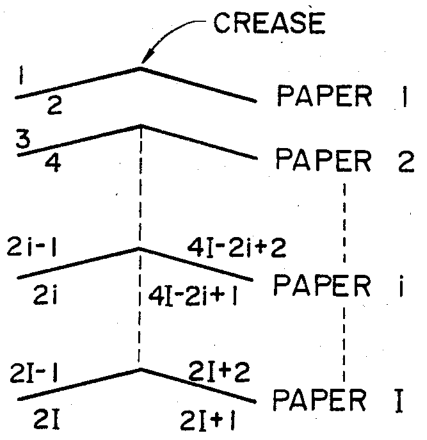
FIGS. 13 and 14 show arrangements of pages in documents which respectively are written horizontally and vertically.

As shown in FIG. 13, page $2i-1$ needs to be reproduced in one side of one face of a single paper i, page $2i$ on the back of that side, page $4I-2i+2$ on the other side, and page $4I-2i+1$ on the back of that side.

(ii) Vertically written documents

Figure 14:
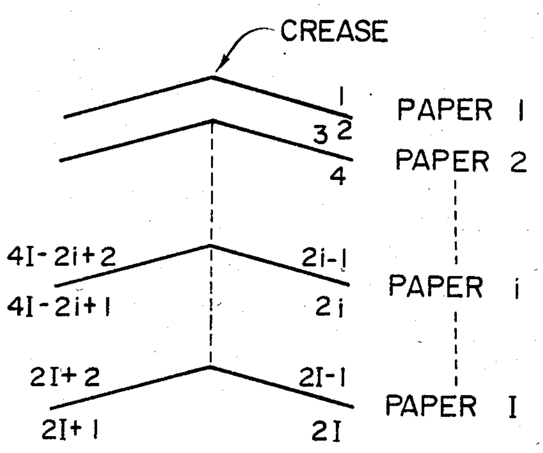

As shown in FIG. 14, page $4I-2i+2$ has to be duplicated on one side of the paper i, page $4I-2i+1$ on the back of that side, page $2i-1$ on the other side of the paper i, and page $2i$ on the back of that side.

It will be seen from the above that the duplicating position of horizontally written documents and that of vertically written documents are symmetrical to each other in the right-and-left direction.

The steps described so far have successfully provided a combination of documents D and papers P, a required number of papers P, and a page arrangement on the papers P. Next, the movement of documents D and that of papers P which occur during the course of center-binding will be considered.

Since the recirculation type document handling device 4 in accordance with the present invention is designed to completely duplicate both faces of a document D fed out of the document tray 6 and, then, began to copy the next document D, as previously stated, it in the case of center-binding fully handles the documents D within a short period of time and, even after the completion of a copying operation, maintains the documents D orderly sorted with respect to pages.

To explain manipulation of documents concerning center binding which is accomplished with the document handing device 4, let it be assumd that ten horizontally written, paged and double-faced documents are desired to be copied on both faces of five A3 papers and the resulting copies are to be center-bound.

Figure 15:
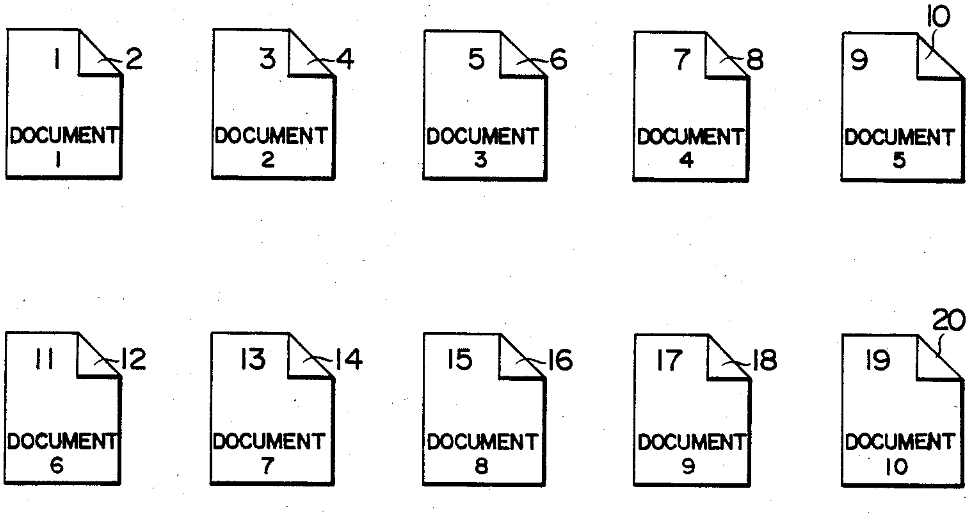
FIG. 15 shows a relationship between image information on documents and pages.
Figure 16:
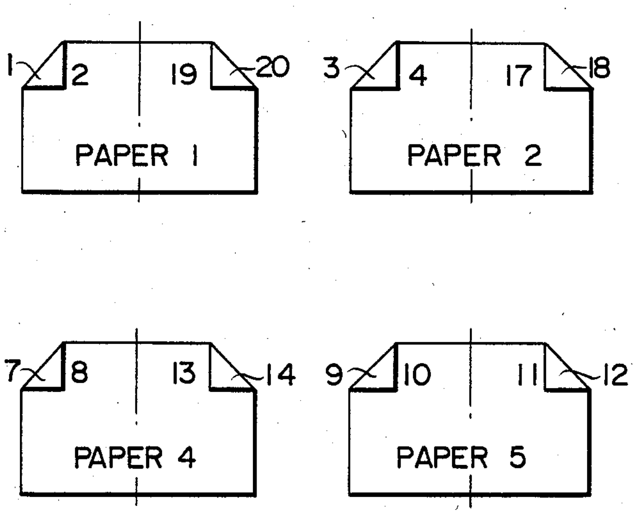
FIG. 16 shows a relationship between papers and pages which carry information therein.

For convenience, as shown in FIG. 15, assume
document 1: page 1 on front, page 2 on back
document 2: page 3 on front, page 4 on back
document 3: page 5 on front, page 6 on back
document 4: page 7 on front, page 8 on back
document 5: page 9 on front, page 10 on back
document 6: page 11 on front, page 12 on back
document 7: page 13 on front, page 14 on back
document 8: page 15 on front, page 16 on back
document 9: page 17 on front, page 18 on back
document 10: page 19 on front, page 20 on back In this case, as shown in FIG. 16, the five A3 papers each carry four pages of the documents:
paper 1: pages 1, 2, 19 and 20 of documents
paper 2: pages 3, 4, 17 and 18 of documents
paper 3: pages 5, 6, 15 and 16 of documents
paper 4: pages 7, 8, 13 and 14 of documents
paper 5: pages 9, 10, 11 and 12 of documents Using the document handling device 4, it is possible to copy the documents in the order of document pages 1, 2, 3, 4, . . . , 17, 18, 19 and 20 or document pages 2, 1, 4, 3, . . . , 18, 17, 20 and 19, that is, the order of documents 1, 2, . . . , 9 and 10 or, alternatively, in the order of document pages 20, 19, 18, 17, . . . , 4, 3, 2 and 1 or document pages 19, 20, 17, 18, . . . , 3, 4, 1 and 2, that is, the order of documents 10, 9, . . . , 2 and 1.

Where the document handling device 4 is used to reproduce ten A4, horizontally written double-faced documents on both faces of ten A3 papers and, then, bind the papers at the center, the documents D and the papers P are transported as will be outline hereinafter.

Concerning the documents D, ten documents D are sequentially stacked on the document tray 6 in the order of documents 10, 9, 8, 7, 6, 5, 4, 3, 2 and 1 with each odd page faced upward. In operation, the lowest document 10 is fed first out of the tray 6 to the glass platen 3 and, immediately after having its page 19 copied, inverted toward the glass platen 3 to have its page 20 copied. Thereafter, the document 10 is inverted to have page 19 facing upward and, then, returned to the document tray 6 to overlie the document 1. The same sequence of events are repeated to copy pages 17 and 18 of the document 9, pages 15 and 16 of the document 8, pages 13 and 14 of the document 7, pages 11 and 12 of the document 6, pages 11 and 12 of the document 6, pages 9 and 10 of the document 5, pages 7 and 8 of the document 4, pages 5 and 6 of the document 3, pages 3 and 4 of the document 2, and pages 1 and 2 of the document 1 in this order. Each of the documents 9–1 is returned to the document tray 6 in the same manner as the document 10.

The documents D on the document tray 6 after the completion of the above-mentioned procedure are stacked in the same order of pages as in the initial loaded condition.

Figure 17:
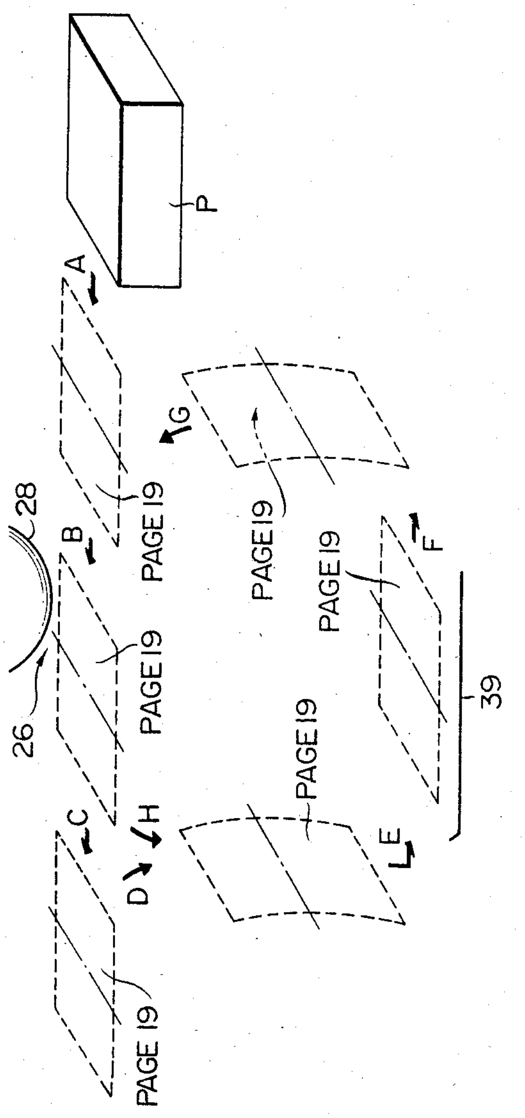
FIG. 17 shows a flow of papers.

Movement of the papers P associated with that of the documents D will be described with reference to FIG. 17.

A paper 1 is fed from the sheet cassette 29 to the transfer station **26*b* and, there, provided with a duplicate of document page 19. Then, the paper 1 advances as indicated by arrows C and D, and then inverted to follow the path indicated by arrows E, F, G and B to be provided with a duplicate of document page 20 on the back of page 19. Subsequently, the paper 1 advances as indicated by arrows H and E to be temporarily stored in the intermediate tray 39**.

By the same procedure, papers 2, 3, 4 and 5 are sequentially fed out of the paper cassette 29 so that document pages 17 and 18 are duplicated on the paper 2, pages 15 and 16 on the paper 3, pages 13 and 14 on the paper 2, and pages 11 and 12 on the paper 4, all the papers P being stacked on the intermediate tray 39.

In the intermediate tray 39, the papers P are stacked in the order of the papers 5, 4, 3, 2 and 1 from the top to bottom and, therefore, they will be sequentially fed out of the tray 39 from the lowermost one, the paper 5. The paper 5 is fed to the transfer station **26*b* to duplicate document page 9, and then transported as indicated by arrows C and D to duplicate page 10. The paper 5 provided with the duplicates of pages 9, 10, 11 and 12 is transported to the folding mechanism 45**.

The above procedure is repeated to copy pages 7 and 8 on the paper 4, pages 5 and 6 on the paper 3, pages 3 and 4 on the paper 2, and pages 1 and 2 on the paper 1. These papers 4–1 are sequentially driven toward the folding mechanism 45.

While the papers have been shown and described as being fed again to the transfer staion **16*b* by way of the intermediate tray 39 without exception, as indicated by arrows E and F, the intermediary of the tray 39** is not essential in accodance with the present invention.

As previously described, application of the reciculation type document handling device 4 for center-binding purpose purpose is advantageous in the following respects:

(1) Documents D are automatically sorted after the copying operation without resornting to any further feed or inversion;

(2) The required number of circulation of documents D is small compared to a reciculation type document handling device of the kind which is incapable of continuously duplicating both faces of a single document D and, therefore, least probable to damage documents D, cause paper jams and other failures.

(3) The frequency of supplying papers P from the intermediate tray 39 is reduced, enhancing reliable transportation of papers P.

While in the illustrative embodiment the documents D have been shown and described as being duplicated in the order of pages 19, 20, 17, 18, . . . , 3, 4, 1 and 2, an alternative order of pages 20, 19, 18, . . . , 4, 3, 2 and 1 is allowable if the documents D are inverted at the time of copying.

Further, if the order of documents D initially loaded in the document tray 6 is such that the document 1 is located at the top and the document 10 at the bottom, each with the front face or odd page facing upward, the documents D may be duplicated in the order of pages 1, 2, 3, 4, . . . , 17, 18, 19 and 20 or pages 2, 1, 4, 3, . . . , 18, 17, 20 and 19, that is, documents 1, 2, . . . , 9 and 10.

The above description has focused to a case wherein the document handling device 4 is used to center-bind five A3 papers which carry duplicates of ten A4 double-faced documents thereon. Hereinafter will be described other examples of the center-binding mode operation.

First, assume twenty A4, horizontally written one-face documents and five A3 papers, as an example of a case wherein the paper size is double the document size and documents are one-faced.

Documents D are laid on the document tray 6 each with the front face carrying information faced upward and in such an order that page 1 is at the top and page 10 at the bottom. Since the documents are sequentially fed from the bottom of the document tray 6 to the glass platen 3, they are duplicated in the order of pages 20, 19, 18, 17, . . . , 4, 3, 2 and 1 while being sequentially returned to the document tray 6. In the returned stack, therefore, the documents D are arraned in the same order of pages as in the initially loaded stack.

The movement of the papers P during the above mode of operation may be summarized as follows:

| | |
|---|---|
| 1 | feed paper 1 from cassette 29 → copy page 20 → invert copy circulate page 19 → intermediate tray 39 |
| 2 | feed paper 2 from cassette 29 → copy page 18 → invert copy circulate page 17 → intermediate tray 39 |
| 3 | feed paper 3 from cassette 29 → copy page 16 → invert copy circulate page 15 → intermediate tray 39 |
| 4 | feed paper 4 from cassette 29 → copy page 14 → invert copy circulate page 13 → intermediate tray 39 |
| 5 | feed paper 5 from cassette 29 → copy page 12 → invert copy circulate page 11 → intermediate tray 39 |
| 6 | feed paper 5 from intermediate tray 39 → copy page 10 → invert copy page 9 → folding mechanism 45 |
| 7 | feed paper 4 from intermediate tray 39 → copy page 8 → invert copy page 7 → folding mechanism 45 |
| 8 | feed paper 3 from intermediate tray 39 → copy page 6 → invert copy page 5 → folding mechanism 45 |
| 9 | feed paper 2 from intermediate tray 39 → copy page 4 → invert copy page 3 → folding mechanism 45 |
| 10 | feed paper 1 from intermediate tray 39 → copy page 2 → invert copy page 1 → folding mechanism 45 |

Even if the documents D are stacked on the document tray 6 with their information carrying surfaces faced downward and such that page 20 is at the top and page 1 at the bottom, the same sequence of events for center-binding will be achieved except for a change in the order of pages to be duplicated, i.e., pages 1, 2, 3, 4, . . . , 17, 18, 19 and 20. It is the prerequisite, however, that each document D be fed to the glass platen 3 after being inverted and before returned to the document tray 6.

Next, assume five A3, horizontally written double-faced documents and five A3 papers to be center-bound, as an example of a case wherein the paper size is equal to the document size and each document is double-faced. Here, document 1: pages 1, 2, 3 and 4
document 2: pages 5, 6, 7 and 8
document 3: pages 9, 10, 11 and 12
document 4: pages 13, 14, 15 and 16
document 5: pages 17, 18, 19 and 20

The documents are stacked on the document tray 6 in the order of documents 5, 4, 3, 2 and 1 with the pages 1 and 2, 5 and 6, 9 and 10, 13 and 14, and 17 and 18 faced upward.

In the above condition, the document 5 at the bottom in the document tray 6 is fed first. That is, the documents 5, 4, 3, 2 and 1 are sequentially duplicated in this order.

In this case, the copying sequence for center-binding may be pages 20, 19, 18, 17, . . . , 4, 3, 2 and 1 or pages 19, 20, 17, 18, . . . , 3, 4, 1 and 2 by way of example.

Figure 18:
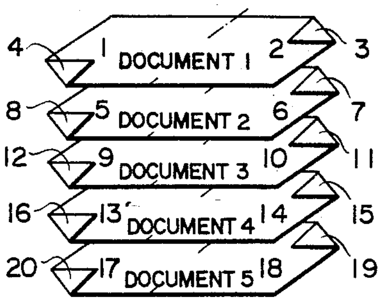
FIGS. 18, 19, 20 and 21 respectively show set conditions of documents and papers.

Thus, the document 5 is first fed to the glass platen 3 to duplicate page 20 and, then, page 19 while being held stationary on the glass platen 3. After the duplication of the page 19, the document 5 is inverted to duplicate page 18 and, then, page 17 without being moved. Thereafter, the document 5 is returned to the document tray 6 to lie on the document 1. This is repeated sequentially for the other documents 4, 3, 2 and 1 in this sequence. When the five documents D are fully duplicated, they will have been arranged in the same order as before the operation as shown in FIG. 18. In the case where a single document carries two pages of information on one face thereof and the previously discussed copying method is to be effected to individually copy them, the latent image representative of a needless page should be removed by erasing means from above the drum 28.

Figure 19:
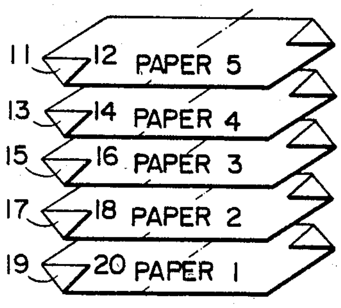

To describe the movement of the papers in the above mode of operation, the paper 1 is fed out of the paper cassette 29 to duplicate page 20 and, then, inverted to duplicate page 19 on the back of page 20. The paper 1 is then temporarily stored in the intermediate tray 39. In the same manner, the papers 2, 3, 4 and 5 are sequentially fed out of the paper cassette 29 so that the paper 2 is provided with duplicates of pages 18 and 17, the paper 3 duplicates of pages 16 and 15, the paper 4 duplicates of pages 14 and 13, and the paper 4 duplicates of pages 12 and 11, while being sequentially stacked in the intermediate tray 39. The papers in the intermediate tray 39 are illustrated in FIG. 19.

Subsequently, the paper 5 is fed from the intermediate tray 39 first so as to copy page 10 and, then, page 9 after being inverted. The paper 5 thus provided with duplicates of pages 9, 10, 11 and 12 thereon is transported to the folding mechanism 45.

Figure 20:
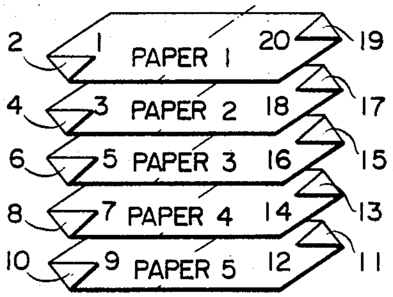

By the same procedure, the paper 4 is provided with duplicates of pages 8 and 7, the paper 3 duplicates of pages 6 and 5, the paper 2 duplicates of pages 4 and 3, and the paper 1 duplicates of pages 2 and 1, the papers 4–1 being sequentially driven to the folding mechanism 45. The papers 5–1 sequentially creased by the folding mechanism 57 are stacked on the coactive guide plates 63 and 64 as shown in FIG. 20. It will be apparent from FIG. 20 that the pages on the papers P are ready to bind.

Next, assume ten A3, horizontally written one-faced documents and five A3 papers to be center-bound, as an example of a case wherein the sheet size is equal to the document size and documents are double-faced.

Figure 21:
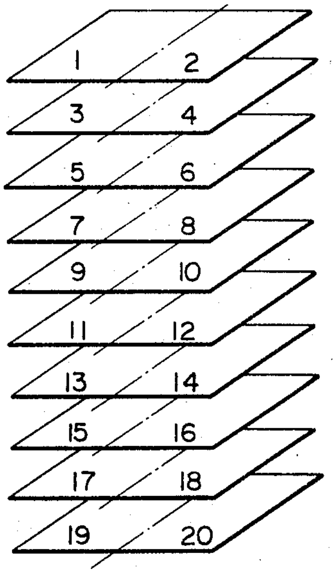

As shown in FIG. 21 documents D are stacked on the document tray 6 with their information carrying surfaces facing upward and such that a document with pages 1 and 2 is located at the top and a document with pages 19 and 20 at the bottom.

Since the documents D are fed one by one from the bottom of the document tray 6, they are duplicated in the order of pages 10, 19, 18, 17, . . . , 4, 3, 2 and 1 or pages 19, 20, 17, 18, . . . , 3, 4, 1 and 2 while being sequentially returned to the tray 6. Again, the documents returned to the tray 6 are in the same order of pages as before the copying operation.

During the above procedure, papers P will be routed as will be described.

| | |
|---|---|
| 1 | feed paper 1 from cassette 29 → copy page 20 → invert circulate<br>copy page 19 → intermediate tray 39 |
| 2 | feed paper 2 from cassette 29 → copy page 18 → invert circulate<br>copy page 17 → intermediate tray 39 |
| 3 | feed paper 3 from cassette 29 → copy page 16 → invert circulate<br>copy page 15 → intermediate tray 39 |
| 4 | feed paper 4 from cassette 29 → copy page 14 → invert circulate<br>copy page 13 → intermediate tray 39 |
| 5 | feed paper 5 from cassette 29 → copy page 12 → invert circulate<br>copy page 11 → intermediate tray 39 |
| 6 | feed paper 5 from cassette 39 → copy page 10 → invert circulate<br>copy page 9 → folding mechanism 45 |
| 7 | feed paper 4 from intermediate tray 39 → copy page 8 → circulate<br>invert copy page 7 → folding mechanism 45 |
| 8 | feed page 3 from intermediate tray 39 → copy page 6 → circulate<br>invert copy page 5 → folding mechanism 45 |
| 9 | feed page 2 from intermediate tray 39 → copy page 4 → circulate<br>invert copy page 3 → folding mechanism 45 |
| 10 | feed page 1 from intermediate tray 39 → copy page 24 → circulate<br>invert copy page 1 → folding mechanism 45 |

The above description has coverd the movement of the documents D and that of papers P in all their possible combinations, i.e., page editing methods, applicable to center-binding which is effected with x1 magnification. The same principle applies to magnifications other than x1 and, therefore, description of the latter will be omitted. Magnifications other than x1 are dependent upon a document size, a paper size and an orientation of documents.

Modifies examples of center-binding will be described hereinafter.

The center-binding using documents and papers equal in size as described above is permissible if dividing document information at the center thereof is not critical, that is, if the right and left parts of document information does not need to be observed at a time. In such a case, information in the right and left parts of a document D will be duplicated on the front and back of a paper P.

However, where a single large table or graph is drawn over the right and left pages of a single document D, it is undesirable to duplicate the table or the graph dividing it at the center. In such a situation, unlike the situation wherein center-binding papers separating the right and left information parts apart, the first odd page of papers P may be left blank and the immediately following even page may be used to copy page 1 of the documents D. Specifically, page 1 of papers P may be left blank, page 2 may be provided with a duplicate of document page 1, and page 3 may be provided with a duplicate of document page 2. Such allos one to see the right and left information on a document D at a time when the center-bound papers P are opened.

In this case, since the first odd page of the papers P is left blank and the immediately following odd page is provided with a duplicate of document page 1, the apparent number of document pages is N+n, where n is the number of odd pages which are left blank. Hence, the Eq. (1) derives a required number I of papers P as is an integer satisfying a relation:

$$\frac{N+n}{4} \leq I < \frac{N+n}{4} + 1 \quad \text{Eq. (2)}$$

Figure 22:
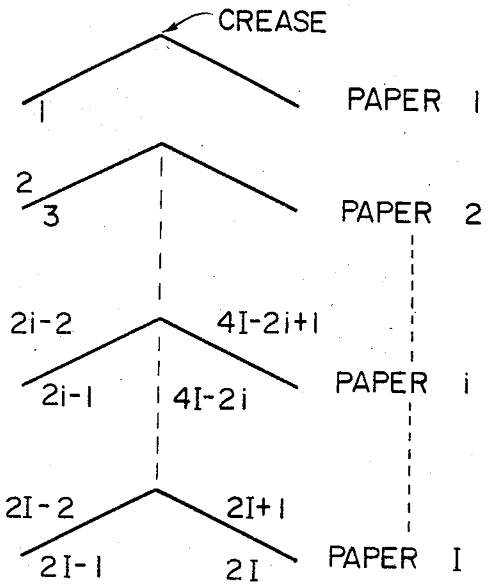
FIG. 22 shows an arrangement of pages of documents on papers page 1 of which is to be left blank.

If page 1 of the papers P is left blank, the pages of the papers P should be arranged as shown in FIG. 22.

Meanwhile, if it is permissible to divide information on the right and left parts of documents D, the papers P may be center-bound such that either the right pages or the left pages appear blank when the papers P are opened. The blank pages are conveniently usable to write down a memorandum or to add information after bookbinding or may even be provided with rules or the like. In this case, no information will be duplicated in the first page or the last page of the papers P.

The number I of papers P necessary for such a one-side blank mode is an integer which satisfies the relation:

$$\frac{N+1}{2} \leq 1 \leq \frac{N+2}{2} \quad \text{Eq. (3)}$$

In accordance with the present invention, booklets produced in any of the various center-binding modes described above may be covered, if desired. For covering purpose, papers which will provide covers are loaded in any one of the three paper cassettes 29. Generally, covers are sometimes provided with duplicates of documents and sometimes not.

Concerning covers, what is required in accordance with the present invention is simply regarding them as a kind of papers P if duplicates are desired thereon and feeding covers to the folding mechanism if otherwise.

Covers may be implemented using ordinary papers P instead of preparing special ones. In addition, use may be made of papers which are different in color and/or thickness or papers with set phrases.

As to vertically written documents, as distinguished from the horizontally written ones discussed above, the papers P will be bound from the right if page 1 is placed on top; they will be bound from the left in the case of horizontally written documents. Two different approaches are available conerning center-binding of papers P which carry duplicates of vertically written documents: (i) loading the documents in the same manner as horizontally written documents and, instead, changing the transfer position on each paper, i.e., page editing system, and (ii) loading the documents in a top-and-bottom orientation which is inverse to that of horizontally written documents and, instead, selecting the same transfer position on each paper as horizontally written documents.

The required number I of papers P in conjunction with vertically written documens, as in the case of horizontally written ones, is produced by the Eq. (1). In accordance with the approach (i) stated above, the papers P will be center-bound as shown in FIG. 14. In FIG. 14, the page arrangement on the i-th paper is such that one side carries page $4I-2i+1$ on the back of page $4I-2i+2$ and the other side carries page $2i$ on the back of page $2i-1$. In this instance, the movement of the documents D and that of the papers P will be such that the transfer position on each paper P is inverse in right-and-left orientation to the page arrangement shown in FIG. 13, which is associated with horizontally written documents.

Figure 23A:
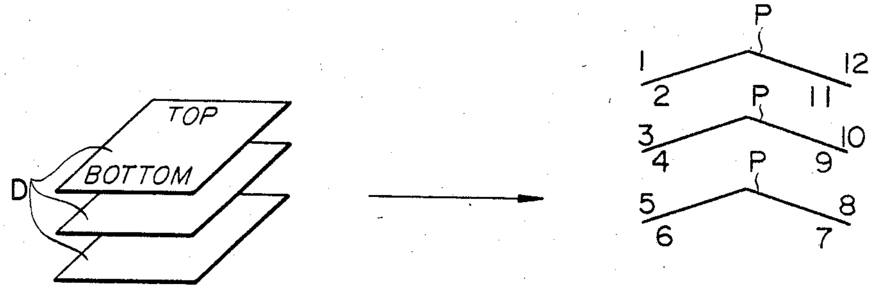
FIGS. 23A and 23B show a difference in set condition between horizontally written documents and vertically written documents conerning a case wherein copies of vertically written documents are to be bound at the center.
Figure 23B:
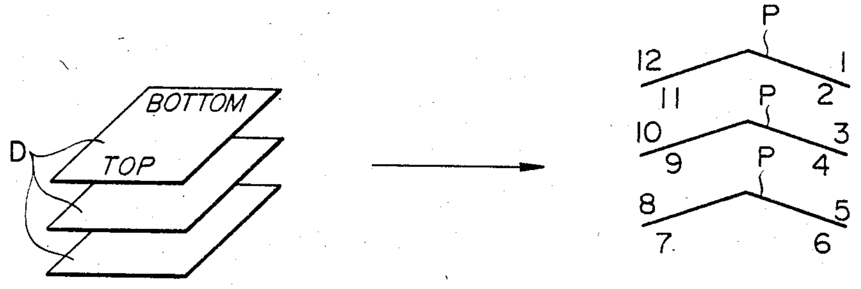

In accordance with the other approach (ii), papers P provided with duplicates of vertically written documents D can be center-bound merely by positioning the documents D in an orientation shown in FIG. 23B which is inverse in the top-and-bottom direction to an orientation shown in FIG. 23A, which relates to horizontally written documents. The page arrangement on the papers P for vertically written documents is the same as for the horizontally written ones.

Where the documents D and the papers P are equal in size, information in the right halves of the documents D have to be duplicated separately. Hence, taking the binding margin into consideration, informations in central regions of the documents D are apt to be lost in the center-binding mode.

The above drawback may be overcome by duplicating the documents such that informations in the central regions of the documents are included in both the right and left pages of the papers P. For example, when imaging is effected in a 99% reduction mode, central regions of A3 documents will each overlap over about 2 millimeters on the papers P.

While the principle discussed hereinabove promotes the efficiency of page editing and other operations in a center-binding mode, it is rather time-consuming and, due to frequent circulation of documents D, apt to damage the documents D in the case of producing a plurality of copies. To speed up the binding operation, the papers P may be subjected only to the editing part of the process based on the previously discussed page editing steps and not to the creasing or binding part, so that the papers P coming out of the copier are usable as alternative documents and can have their right and left pages duplicated at the same time.

It will be seen that a copier with a bookbinding function of the present invention achieves various unprecedented advantages as enumerated below.

(1) Papers provided with duplicates of documents, whether they be horizontally written or vertically written, can be center-bound without the need for the papers or the documents to move in an intricate way.

(2) Since papers coming out of a copying device are creased and stacked one by one, they can be laid one upon another while being orderly creased throughout the pages and, therefore, can be bound neatly to provide attractive booklets.

(3) Even in a copier of the type accommodating a plurality of different paper sizes, papers can be center-bound with their creases, or center, accurately positioned between a binding member and a seat in a binding station. Such enhances efficient center-binding of papers with no regard to the paper size.

(4) Papers can be center-bound with a cover.

(5) Since center-bound papers are stacked in a fully bound condition, it is needlss for one to fold papers double each time he or she picks them out, remarkably promoting the ease of manipulation.

(6) Papers with duplicates of documtns can be selectively bound at the center or an edge by a single binding mechanism. This eliminates the need for an exclusive edge-binding mechanism independent of a center-binding mechanism, thereby simplifying the structure, enhancing easy manipulation, and cutting down the dimensions.

Various modifications will become possible for those skilled in the art after receiving the teachings of the present disclosure without departing from the scope thereof.

What is claimed is:

1. A copier having a function of binding copy papers, comprising:

a copying device including an inverting mechanism for inverting the copy papers each carrying a copied image on the face thereof, and an intermediate tray for temporarily storing said copy papers to prepare for duplication on the other faces of the copy papers;

a recirculation type document handling device including a document tray for accommodating documents, and an inverting mechanism neighboring a glass platen of said copying device, said document handling device returning the documents fed out of said document tray back to the document tray after both faces, if necessary, of the documents have been illuminated by the copying device; and a bookbinding device conjugate with a transport path along which the copy papers are discharged from the copying device, said bookbinding device including a folding mechanism for creasing each of the copy papers at a central portion, and a binding mechanism conjugate with said folding mechanism.

2. A copier as claimed in claim 1, wherein the folding mechanism of the bookbinding mechanism comprises a pair of conveyor rollers positioned in an inlet portion of the folding mechanism, a folding roller located at a downstream side of said conveyor rollers to be movable toward and away from one of the conveyor rollers, a pair of rolls located at a downstream side of said folding roller to convey the sheets by a friction force which is weaker than a friction force of the conveyor rollers, a stop retractably facing a downstream side of said rolls such that the copy paper abutted against said stop is prevented from moving, and a sensor interposed between said rolls and said stop to move the folding roller away from the conveyor roller upon sensing presence/absence of the copy paper.

3. A copier as claimed in claim 2, wherein the stop is constructed to be movable in an intended copy paper transport direction depending upon a size of the copy papers.

4. A copier as claimed in claim 2, wherein a plurality of the stops are provided commensurate with sizes of the copy papers.

5. A copier as claimed in claim 2, wherein the rolls is movable at a peripheral speed which is higher than a peripheral speed of the conveyor rollers.

6. A copier as claimed in claim 2, wherein the folding mechanism further comprises a non-bind tray movably disposed at a downstream side of the stop.

7. A copier as claimed in claim 2, wherein an intended copy paper transport direction is perpendicular to shorter sides of the copy papers, the center of each of the copy papers being creased in a direction perpendicular to the copy paper transport direction.

8. A copier as claimed in claim 1, wherein the folding mechanism of the bookbinding device comprises a pair of conveyor rollers located at an inlet of the folding mechanism, a pair of folding rollers located in a passageway downstream of said conveyor rollers, one of said folding rollers being provided with an axially extending slot and a creasing member which is disposed inside said one folding roller to be projectable through said slot, the other folding roller being made of an elastic material to be deformable when said creasing member pressingly abuts against a periphery of said other folding roller, and a stop located in a passageway upstream of the folding rollers for temporarily obstructing the copy paper to time the copy paper to the creasing member.

9. A copier as claimed in claim 1, wherein the bookbinding device comprises a support member for folding each of the copy papers at a center of the paper and stacking the folded copy papers in an upwardly convex form and such that the resulting creases of the papers face upward, and a binding member located above said support member for binding along the creases the copy papers which are supported by the support member.

10. A copier as claimed in claim 9, wherein the binding mechanism comprises a pair of guide plates located one at one side of the support member and the other at the other side for supporting the copy papers stacked thereon, said guide plates being movable to provide a conical section in combination when the copy papers are to be bound at the center and to provide a substantially horizontal section when the papers are to be bound at an edge.

11. A copier as claimed in claim 10, wherein one of the guide plates is provided with a positioning member for positioning the copy papers when the papers are to be selectively bound at the center and at the edge.

12. A copier as claimed in claim 1, wherein the bookbinding device further comprises a stacking mchanism for stacking the copy papers which are discharged from the binding mechanism in a developed position.

13. A copier as claimed in claim 12, wherein the stacking mechanism comprises a tray which has two sides which provide a generally L-shaped section in combination and are inclined respectively at angles $\theta_1$ and $\theta_2$ to the horizontal which are such that the copy papers are positioned substantially upright in said tray when bound at an edge and collapsed in double-fold along creases provided by the folding mechanism when bound at the center.

14. A copier as claimed in claim 1, wherein cover papers for use as covers are loaded in a paper cassette which is removably mounted in the copying device, said papers being fed one by one to the binding mechanism to lie outwardly of an outermost copy paper, the cover paper and the copy papers being bound together.

15. A copier as claimed in claim 14, wherein the cover paper is equal in size to the copy papers.

16. A copier as claimed in claim 14, wherein the cover paper is fed to the binding mechanism after being provided with a duplicate of image information.

* * * * *